United States Patent
Yeung (10) Patent No.: US 6,377,703 B1
(45) Date of Patent: *Apr. 23, 2002

(54) APPARATUS AND METHOD FOR DETERMINING AN AREA ENCOMPASSING AN IMAGE FOR SCANNING THE IMAGE

(75) Inventor: Bik-Chung Yeung, Cupertino, CA (US)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/189,306

(22) Filed: Nov. 10, 1998

(51) Int. Cl.⁷ .................................................. G06K 9/34
(52) U.S. Cl. ....................... 382/173; 382/164; 382/171; 382/318; 358/453; 358/462
(58) Field of Search ................................. 382/164–173, 382/165, 176, 318, 171, 312, 319; 358/462, 538, 453

(56) References Cited

U.S. PATENT DOCUMENTS

| | | |
|---|---|---|
| 4,574,393 A | 3/1986 | Blackwell et al. |
| 4,656,665 A | 4/1987 | Pennebaker |
| 4,667,228 A | 5/1987 | Kawamura et al. |
| 4,903,145 A | 2/1990 | Funada |
| 5,001,576 A | 3/1991 | Tanaka et al. |
| 5,075,788 A | 12/1991 | Funada |
| 5,109,274 A | 4/1992 | Washio et al. |
| 5,133,022 A | 7/1992 | Weideman |
| 5,177,602 A | 1/1993 | Fujimori |
| 5,287,204 A | 2/1994 | Koisumi et al. |
| 5,289,296 A | 2/1994 | Yamada |
| 5,321,531 A | 6/1994 | Hasebe et al. |
| 5,331,442 A | 7/1994 | Sorimachi |
| 5,335,292 A | 8/1994 | Lovelady et al. |
| 5,347,374 A | 9/1994 | Fuss et al. |
| 5,420,938 A | 5/1995 | Funada et al. |
| 5,467,196 A | 11/1995 | Fukushima et al. |
| 5,489,997 A | 2/1996 | Usami |
| 5,568,571 A | 10/1996 | Willis et al. |
| 5,633,952 A * | 5/1997 | Outa et al. .................... 382/165 |
| 5,740,333 A | 4/1998 | Yoh et al. |
| 5,742,704 A | 4/1998 | Suzuki et al. |
| 5,748,773 A | 5/1998 | Tashiro et al. |
| 5,751,848 A | 5/1998 | Farrell |
| 5,778,092 A * | 7/1998 | Macleod et al. ............. 382/176 |
| 5,786,906 A | 7/1998 | Shishhizuka |
| 5,802,214 A * | 9/1998 | Eschbach et al. ............ 382/254 |
| 5,867,593 A * | 2/1999 | Fukuda et al. ............... 382/176 |
| 5,911,004 A | 6/1999 | Ohuchi et al. |
| 5,956,468 A | 9/1999 | Ancin |
| 5,973,804 A | 10/1999 | Yamada |
| 5,974,199 A * | 10/1999 | Lee et al. ..................... 382/289 |
| 6,049,636 A | 4/2000 | Yang |
| 6,064,494 A | 5/2000 | Hirota et al. |
| 6,118,895 A * | 9/2000 | Hirota et al. ................ 382/165 |
| 6,011,857 A * | 11/2000 | Sowell et al. ................ 382/100 |
| 6,151,426 A * | 11/2000 | Lee et al. ..................... 382/319 |

* cited by examiner

Primary Examiner—Bhavesh Mehta
Assistant Examiner—Ali Bayat (57) ABSTRACT

A scanner performs an initial low resolution scan of an area including an image and, after analyzing the initial scan data to determine the type of the image, a computer sends commands to the scanner to direct the scanner to perform a second scan. The second scan can be limited to the precise area of the image, and can be customized to perform efficient scanning based in the image type (e.g., color vs. black and white, or photo vs. text).

28 Claims, 10 Drawing Sheets

APPARATUS AND METHOD FOR DETERMINING AN AREA ENCOMPASSING AN IMAGE FOR SCANNING THE IMAGE

I. BACKGROUND OF THE INVENTION

The present invention relates generally to locating an image to be scanned and, in particular, to processing data from an initial scan to determine an area including the image and scanning the image a second time from the determined area.

A flatbed scanner is a device that converts an image into digital data values. In conventional flatbed scanner systems, an image, such as a photograph or document, is placed on a bed of the scanner, and the scanner scans the bed, including the image, and converts the scanned area into an array of data values. Each data value corresponds to a different area of the scanned bed. Two factors determine how much data is generated by the scan: the resolution of the scan and the type of information generated by the scan.

The first factor, resolution, is based on the size of each area from which data is generated. For example, one inch by one inch areas would yield a lower resolution than areas of 0.1 inch by 0.1 inch because higher resolutions have more data values for each area. Resolution is often measured in dots per inch (dpi). A low resolution would be 50 dpi, while a high resolution for certain systems is 600 dpi.

The second factor, the type of information generated by the scan, is based on the amount of information calculated for each area, which typically depends on whether the scan is for black and white, gray scale, or color. For example, if each area is merely converted to black and white colors, then each area only can be represented by a single bit. On the other hand, if each area is converted to color, each area must be represented by more bits, for example, eight bits for red, eight bits for green, and eight bits for blue.

In addition to the resolution and the type of information generated by the scan, the size of the scanned area also affects the amount of data from the scan. In conventional systems the entire bed is scanned, even though the image may only occupy a fraction of the scanner bed. Techniques have been developed for determining an area containing the image so the scanner need only scan that area, but such techniques are often not accurate because they do not account for characteristics of different types of images. For example, when scanning a text image, conventional systems often scan the bottom line of text in a manner that misses underscores because conventional scanning techniques assume that the image starts at the lowermost edge of the last line of text, which is above an underscore.

Conventional systems also scan every image the same way, irrespective of the image color. For example, most systems simply assume the image is color, and scan the image to develop red, green and blue values. This creates the same amount of data irrespective of whether the data is black and white or color.

II. SUMMARY OF THE INVENTION

Apparatus and methods consistent with this invention provide for an improved determination of image characteristics. An apparatus consistent with the principles of the invention for determining an image area in a scanning area containing an image comprises an element for receiving initial scan data corresponding to the scanning area, an element for processing the initial scan data to categorize the image by type, and an element for determining, based on the type, the image area which is a subset of the scanning area and includes the image. Because the apparatus determines the type of image, and uses the type of image in determining a subset of the scanning area, a more accurate scan can be performed.

A method consistent with the principles of the invention comprises receiving initial scan data corresponding to the scanning area, processing the initial scan data to categorize the image by type, and determining, based on the type, the image area which is a subset of the scanning area and includes the image. Similar to the apparatus, because the method determines the type of image, and uses the type of image in determining a subset of the scanning area, a more accurate scan can be performed.

The invention may also be embodied in a system, an computer-readable medium, a signal, or other form. Each form provides an improved way of scanning an image area.

III. BRIEF DESCRIPTION OF THE DRAWINGS

The accompanying drawings, which are incorporated in and constitute a part of this specification, illustrate an embodiment of the invention and together with the description, serve to explain the principles of the invention.

FIGS. 5(*a*), 5(*b*), 5(*c*) and 5(*d*), illustrate red, blue, green, and gray histograms, respectively;

FIGS. 6(*a*), 6(*b*) and 6(*c*), illustrate characteristic gray histograms of photo, text, and mixed images, respectively;

IV. DETAILED DESCRIPTION OF THE PREFERRED EMBODIMENTS

Reference will now be made in detail to systems and methods consistent with the claimed invention that are illustrated in the accompanying drawings. Wherever possible, the same reference numbers will be used throughout the drawings to refer to the same or like parts.

Figure 1:
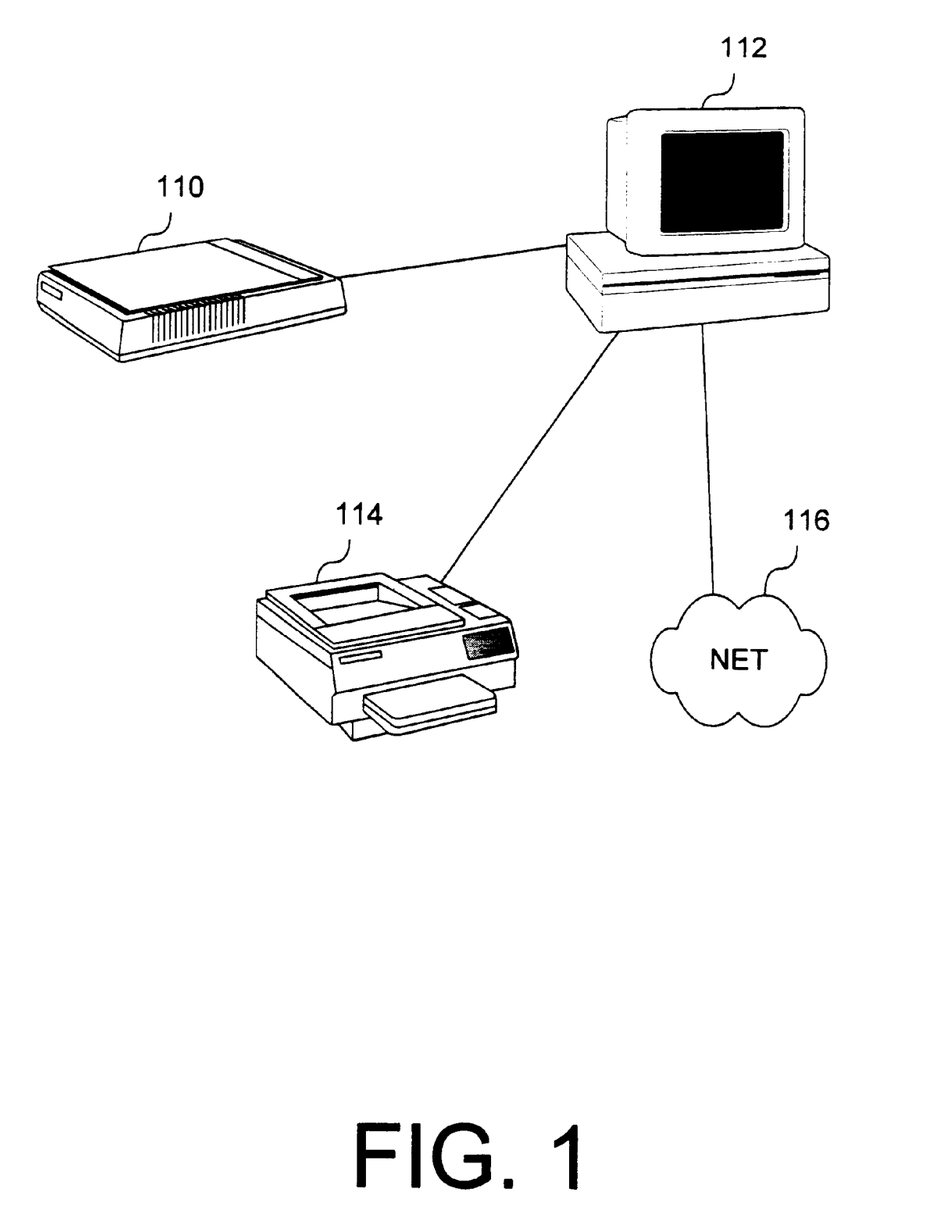
FIG. 1 is a block diagram illustrating a system in which methods and apparatus consistent with this invention may be practiced.

FIG. 1 is a block diagram of a system capable of performing the methods and apparatus consistent with this invention. In FIG. 1, scanner 110 converts images into data, and transmits the data to computer 112. Computer 112 processes the data and may send the image data to different destinations, such as the display of computer 112, printer 114, or network 116. Preferably scanner 110 is an EPSON scanner, although other scanners may be used.

Consistent with this invention, scanner 110 first performs a low resolution scan across the entire scanner bed and sends the data to computer 112 for further processing. Computer 112 processes the low resolution data to look for particular characteristics, and sends commands to scanner 110 based on those characteristics. The commands direct scanner 110 to perform scanning operations that will optimize the scan for the image. The second scan of the image creates a second set of digital data for computer 112, which computer 112 may further process or transmit to a destination.

For example, computer 112 processes the initial low resolution data from the scanner to determine three things: (1) the coordinates of a rectangular area that encompasses the image on the bed of scanner 110 (called "autolocate"); (2) whether the image is a photo, text, or mix of text and photo; and (3) whether the image is a black and white or color image. Based on these determinations, computer 112 sends commands to scanner 110 to scan the image in way that provides an accurate scan of the image, but reduces the amount of unnecessary data.

For example, if computer 112 determines that the image is text, computer 112 can send a command to scan a rectangular area that is slightly enlarged to ensure that underscores are included in the scan. If computer 112 determines that the image is black and white, computer 112 can command scanner 110 to scan the image using a gray scale code, thus reducing the amount of data from the second scan.

Figure 2:
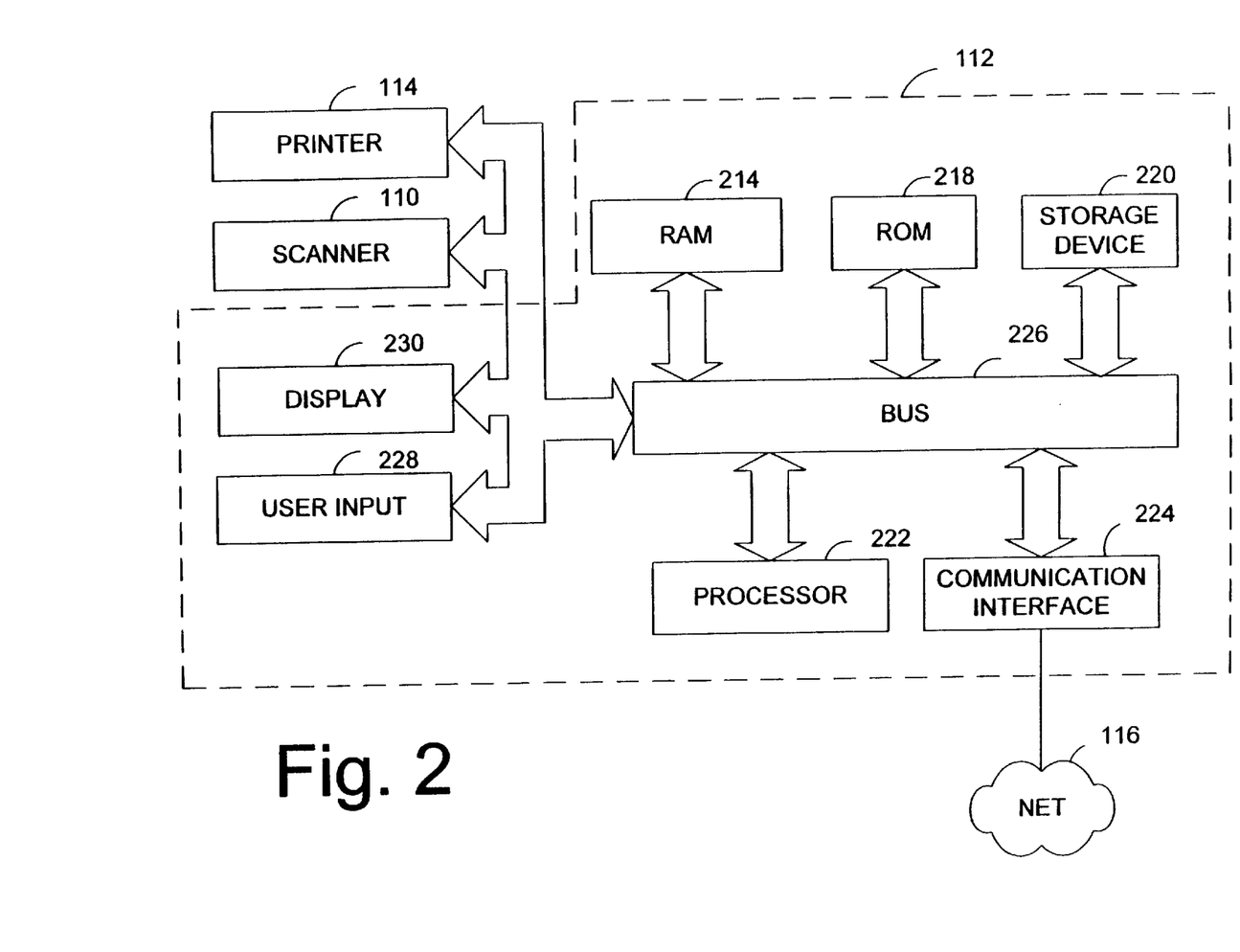
FIG. 2 is a block diagram of a graphics system that may be used to implement the system shown in FIG. 1.

FIG. 2 is a block diagram of a graphics system that may be used to implement the system shown in FIG. 1. Computer system 112 in FIG. 2 can be a general purpose computer system, such as a conventional personal computer or laptop computer, that includes RAM 214, ROM 218, storage device 220, processor 222, and communication interface 224, all interconnected by bus 226. Bus 226 also connects to user input 228 and display 230. User input 228 may be one or more user input devices, such as a keyboard, joystick, or mouse. Display 230 may be a CRT or other type of display device. Finally, bus 226 connects to scanner 110 and printer 114.

RAM 214, which can be any dynamic storage device, stores instructions for carrying out the methods and apparatus described herein. These instructions are executed by processor 222. For example, processor 222 can perform the autolocate, image type determination and color determination consistent with this invention.

ROM 218 is used for storing static information and instructions used by processor 222. Storage device 220, such as a magnetic or optical disk, can also store instructions and data for computer system 212.

The data analysis techniques consistent with this invention may be implemented by computer system 112 using hardware, software, or a combination of hardware and software. For example, appropriate programs may reside in any one or more of RAM 214, ROM 218, or storage device 220, and processor 222 executes the programs.

Such programs may also be read into RAM 214 from another computer-readable medium, such as storage device 220. Execution of sequences of instructions contained in RAM 214 causes processor 222 to carry out apparatus and methods consistent with the present invention described herein.

Hard-wired circuitry may be used in place of or in combination with software instructions to implement the invention. Thus, implementations consistent with the invention are not limited to any specific combination of hardware circuitry and software.

The term "computer-readable medium" as used herein refers to any medium that participates in providing instructions to processor 222 for execution. Such a medium may take many forms, such as non-volatile memory media, volatile memory media, transmission media, as well as equivalents. Non-volatile memory media includes optical or magnetic disks, such as storage device 220. Volatile memory media includes RAM. Transmission media includes coaxial cables, copper wire and fiber optics, including the wires that comprise bus 226. Transmission media can also take the form of acoustic or light waves, such as those generated during radio wave and infrared data communications.

Common forms of computer-readable media include a floppy disk, a flexible disk, hard disk, magnetic tape, or any other magnetic storage medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read and use.

Various forms of computer-readable media may be involved in carrying one or more sequences of instructions to processor 222 for execution. For example, the instructions may initially be carried on a magnetic disk or a remote computer. The remote computer can load the instructions into its dynamic memory and send the instructions over a telephone line using a modem. A modem local to computer system 212 can receive data from the telephone line and use an infrared transmitter to convert the data to an infrared signal. An infrared detector coupled to appropriate circuitry can receive the data carried in the infrared signal and place the data on bus 226. Bus 226 carries the data to RAM 214, from which processor 222 retrieves and executes the instructions. Processor 222 may store the instructions received by RAM 214 on storage device 220 either before or after execution.

Computer system 212 also includes a communication interface 224 coupled to bus 226. Communication interface 224 provides two way communications to other systems. For example, communication interface 224 may be an ISDN card or a modem to provide a data communication connection to a corresponding type of telephone line. Communication interface 224 may also be, for example, a LAN card to provide communication to a LAN. Communication interface 224 may also be a wireless card for implementing wireless communication between computer system 212 and wireless systems. In any such implementation, communication interface 224 sends and receives electrical, electromagnetic or optical signals that carry data streams representing various types of information.

The link between communication interface 224 and external devices and systems typically provides data communication through one or more networks or other devices. For example, the link may connect a local network (not shown) to a host computer or to equipment operated by an Internet Service Provider (ISP), which provides data communication services through the Internet. Local networks and the Internet both use electrical, electromagnetic or optical signals that carry digital data streams. The signals through the various networks and the signals between the networks and communication interface 224, which carry the digital data to and from computer system 212, are exemplary forms of carrier waves transporting the information.

Computer system 212 can send messages and receive data, including program code, through the network(s) via the link between communication interface 224 and the external systems and devices. For example, if the system were connected to the Internet, a server might transmit a request code for an application program through the Internet, an ISP, a local network, and communication interface 224.

Program code received over the network may be executed by processor 222 as it is received, or it can be stored in memory, such as in storage device 220, for later execution. In this manner, computer system 212 may obtain application code in the form of a carrier wave.

Figure 3:
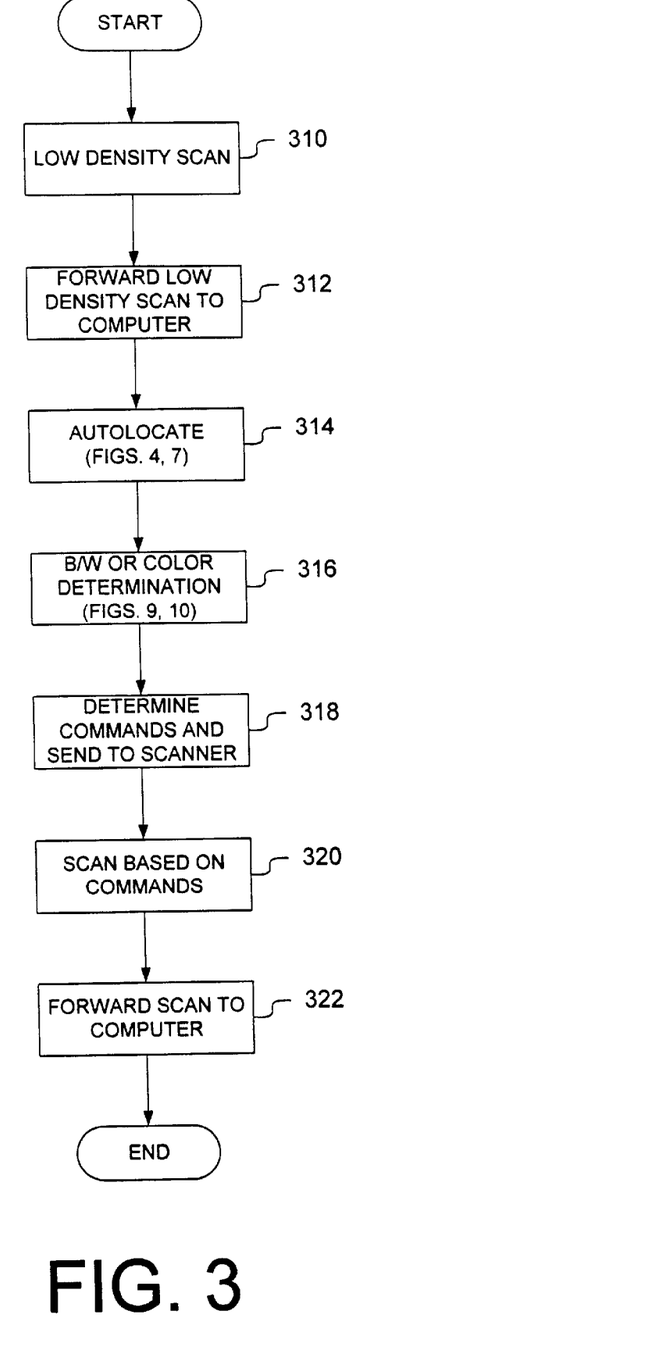
FIG. 3 is a flow chart showing the overall processing performed by the system of FIG. 1.

FIG. 3 is a flow chart showing the overall processing performed by the system of FIG. 1. Scanner 110 performs two scans: first, a low-density scan to generate data for processing by computer 112, and second, a scan in response to commands received from computer 112 after processing the low-density data. The low-density scan is performed across the entire bed of the scanner (step 310), for example at 50 dpi. The results of low-density data can be transferred to computer 112 (step 312) as 24-bit data: 8 bits of red, 8 bits of green and 8 bits of blue data.

Computer 112 processes the low resolution data and performs an autolocate determination (step 314) to define a rectangular area encompassing the image. Computer 112 also determines whether the image is black and white or color (step 316) in a manner described below in the discussions of FIGS. 9 and 10. Based on these determinations, computer 112 develops commands appropriate to the characteristics of the image, and sends those commands to scanner 110 (step 318) to direct scanner 110 to scan the rectangular area encompassing the image in accordance with whether the image is black and white or color. In response, scanner 110 scans the image based on the commands from computer 110 (step 320) and forwards the scanned information to computer 112 (step 322). Scanning only the area of the bed encompassing the image, and only in accordance with whether the image is black and white or color, optimizes the scanning operation and reduces the amount of data representing the image.

Figure 4:
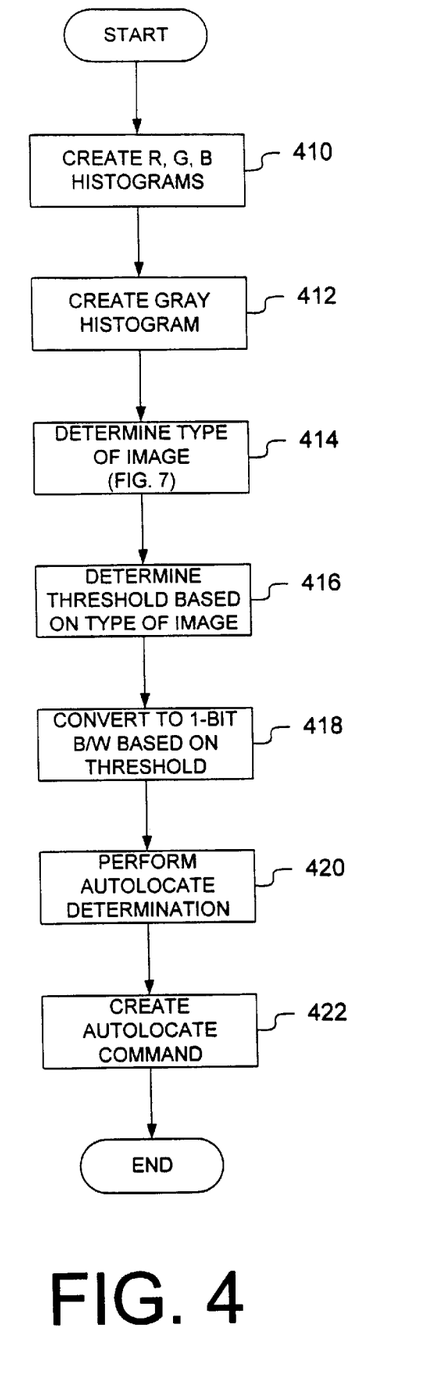
FIG. 4 is a flow chart showing the processing performed by computer 112 in making the autolocate determination of FIG. 3.
Figure 5A:
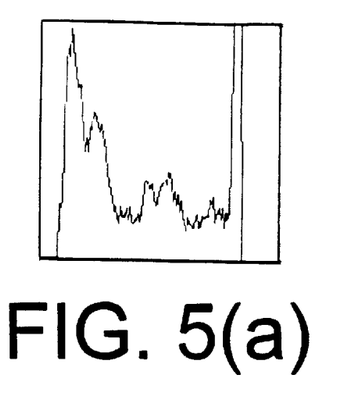
Figure 5B:
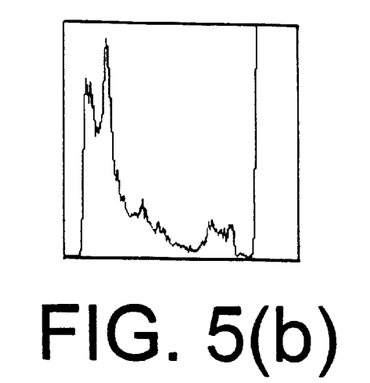
Figure 5C:
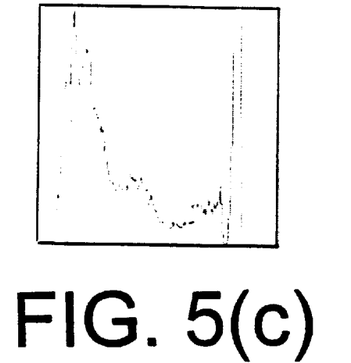
Figure 5D:
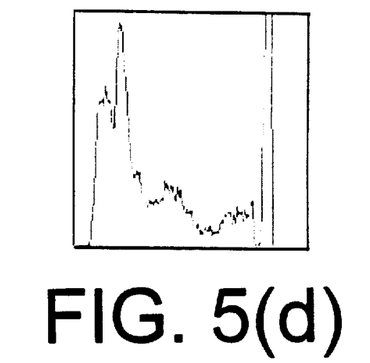

FIG. 4 is a flow chart showing the processing performed by computer 112 in making the autolocate determination (step 314) of FIG. 3. First, computer 112 analyzes the low density data received from scanner 110 to develop red, green and blue histograms of the data (step 410).

FIGS. 5(a), 5(b), 5(c), and 5(d) illustrate red, blue, green, and gray histograms, respectively. The horizontal axis of each histogram represent color values, and the vertical axis represents the frequency of the particular values in a scan. The frequency spike on the right side of each graph is a result of the large amount of white space of the scanner bed outside the image area.

Returning to FIG. 4, computer 112 creates a gray value histogram from the red, green and blue histograms (step 412). The gray histogram is created by weighing the value of each of the red, green and blue histograms according to the equation $Gray_x = 0.2*Red_x + 0.6*Green_x + 0.2*Blue_x$, where x is a particular measured color value. For example, the x color values can range from 0 to 255.

Figure 6A:
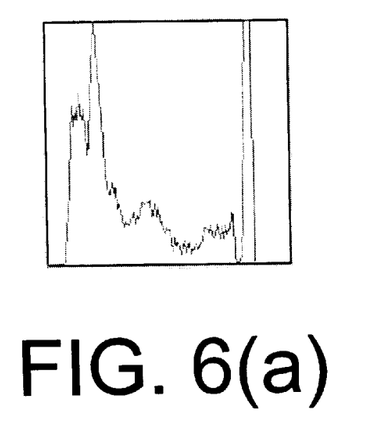
Figure 6B:
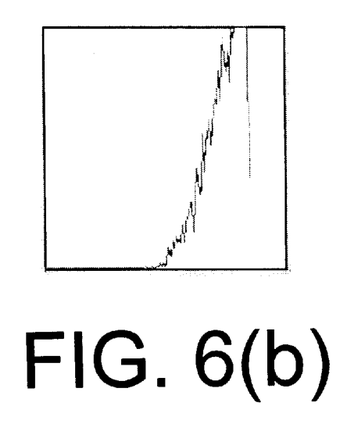
Figure 6C:
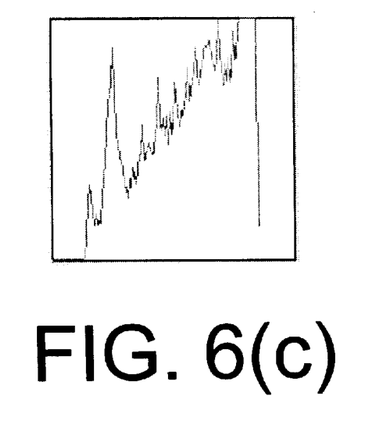

FIGS. 6(a), 6(b) and 6(c), illustrate characteristic gray histograms of photo, text, and mixed images, respectively. The gray histogram has particular characteristics depending upon whether the image is a photo, text, or a mix of image and text. For example, the photo histogram illustrated in FIG. 6(a), the text histogram of FIG. 6(b), and the mixed histogram of FIG. 6(c) have respectively different maximum and minimum value characteristics. Computer 112 processes the gray histogram from the initial scan data to determine what type of image (e.g., photo, text, or mixed) was scanned in by scanner 110 (step 414). Based on the type of image, computer 112 determines a threshold associated with the scanned data (step 416), and converts the data to 1-bit black and white data based on the threshold (step 418).

Figure 7:
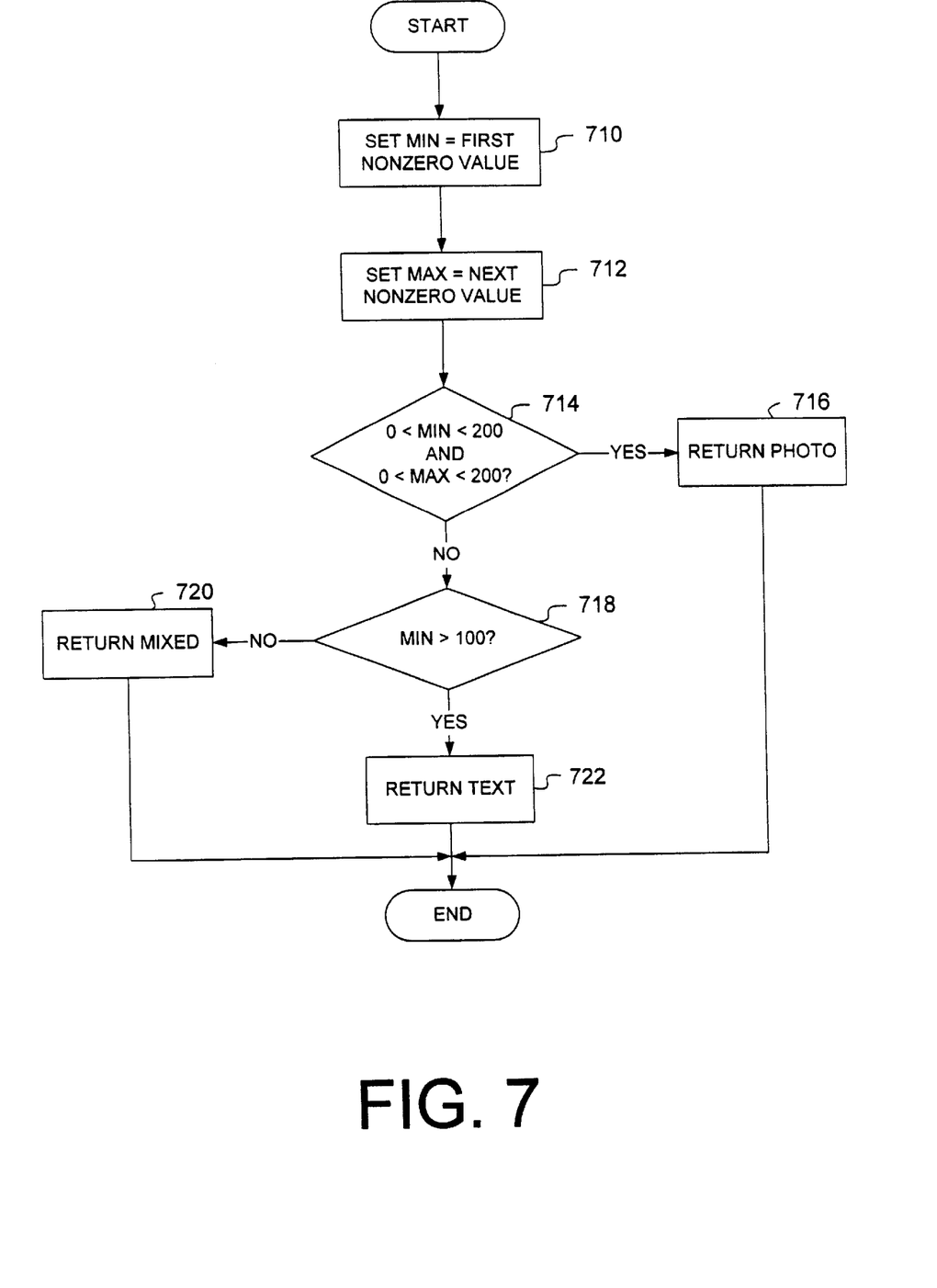
FIG. 7 is a flow chart showing the processing for determining the type of image in FIG. 4.

FIG. 7 is a flow chart showing the processing performed by computer 112 in determining the type of image. Computer 112 first sets a variable MIN to the first nonzero value in the histogram (step 710). Computer 112 finds MIN by starting at the first color value on the horizontal axis and looking at increasing color values until one of those values has a nonzero frequency value associated with it. Computer 112 then sets MAX to the last non zero value (step 712).

Experience has shown that different types of images have different MIN and MAX characteristics. For example, if MIN and MAX both fall between the values of zero and 200 (step 714), computer 112 returns an indication that the image is photo (step 716). If MIN and MAX do not fall between zero and 200, and if MIN is less than or equal to 100 (step 718) computer 112 returns an indication that the image is a mix of text and image (step 720). If MIN is greater than 100, computer 112 returns an indication that the image is text (step 722).

Computer 112 also uses the type of the image to determine a threshold. For a photo, threshold $=0.9*(MAX-MIN)$. For mixed text and image, threshold=MAX if MAX<220, but threshold=220 if MAX$\geq$220.

For text, the computer must calculate a variable iFIVE, a variable found by calculating SUM, the sum of all frequency values in the gray histogram, determining a value F=0.05*SUM, and setting iFIVE to the first x value for which the sum of the frequencies for all values of x and lower is greater than F. Once this is done, threshold=iFIVE, if iFIVE<220, or 220 if iFIVE$\geq$220.

Returning to FIG. 4, computer 112 uses the threshold to convert the low resolution data into 1-bit black and white data (Step 418 in FIG. 4). The conversion simply involves converting all pixels having a value above the threshold to 1, indicating white, and all pixels below the threshold to 0, indicating black.

Using the black and white data, computer 112 performs an autolocate function (step 420) to determine a rectangular area encompassing the image, and creates a command for the scanner based on the autolocate determination (step 422). Converting the data to black and white based on the type of image allows a more accurate autolocate determination. One reason is that computer 112 can determine the edge of the image with greater certainty by reducing the likelihood that an artifact on the scanner bed, such as dirt, would be interpreted as the edge of the image.

Figure 8:
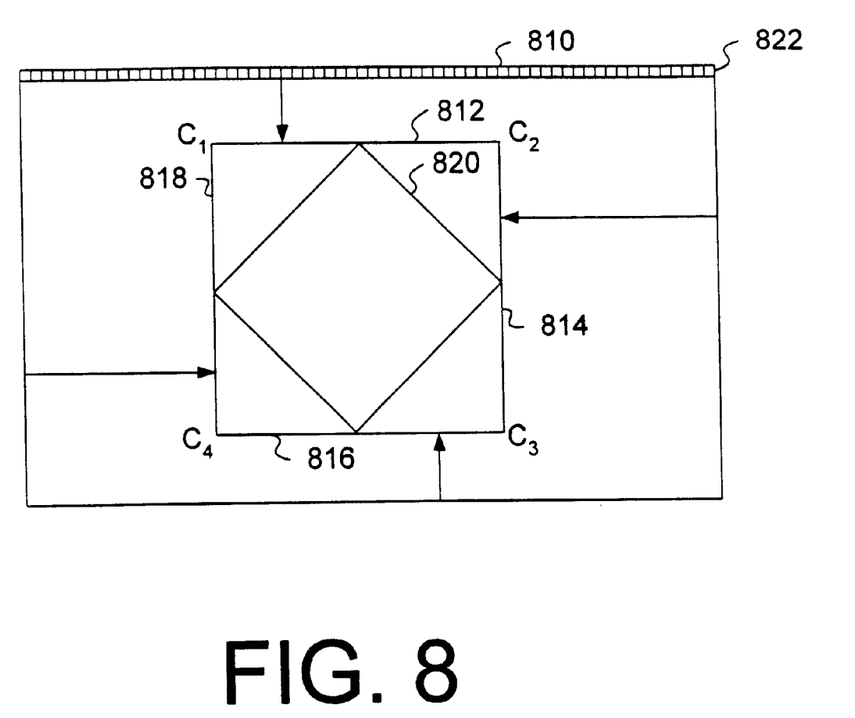
FIG. 8 is diagram showing the autolocate function of FIG. 4.

FIG. 8 is block diagram that illustrates the process performed by computer 112 in performing the autolocate function. Area 810 represents a data array stored in memory with values corresponding to discrete areas of the scanner bed. Image area 820 represents the image area which has been converted to black and white values of 0 and 1. Image area 820 therefore includes a mix of black and white data, and the area outside of image area 820 is white. The goal of the autolocate function is to determine the area defined by corners $C_1$ $C_2$ $C_3$ $C_4$, which define a rectangle encompassing image area 820. In FIG. 8 image area 820 is skewed relative to the scanner bed. Therefore, the rectangle defined by corners $C_1C_2C_3C_4$, which is aligned with the scanner bed, covers more area than image area 820. In a situation where image area 820 is aligned with the scanner bed, the image area 820 and rectangular area $C_1C_2C_3C_4$ would be coextensive.

Computer 112 determines rectangle $C_1$ $C_2$ $C_3$ $C_4$ having sides 812, 814, 816 and 818, by sequentially scanning the values in the data array inward from each edge of area 810 until a black value is found. A black value indicates that an edge of image 820 has been reached. For example, computer 112 starts with the upper left corner of area 810 and sequentially scans each value in row 822 for black values. This continues to the right until a row of values have been traversed, and continues with consecutive rows until a black value is found. In FIG. 8, this is indicated by edge 812. This process is repeated to find, in addition to uppermost edge 812, lowermost edge 816, leftmost edge 818 and rightmost edge 814. After determining rectangle $C_1$ $C_2$ $C_3$ $C_4$, computer 112 can create a command based on the rectangle and the type of image. For example, if the image is text, computer 112 may send a command to scanner 110 to scan an area slightly larger than rectangle $C_1$ $C_2$ $C_3$ $C_4$ to ensure that certain text features, such as underscores, are captured.

Figure 9:
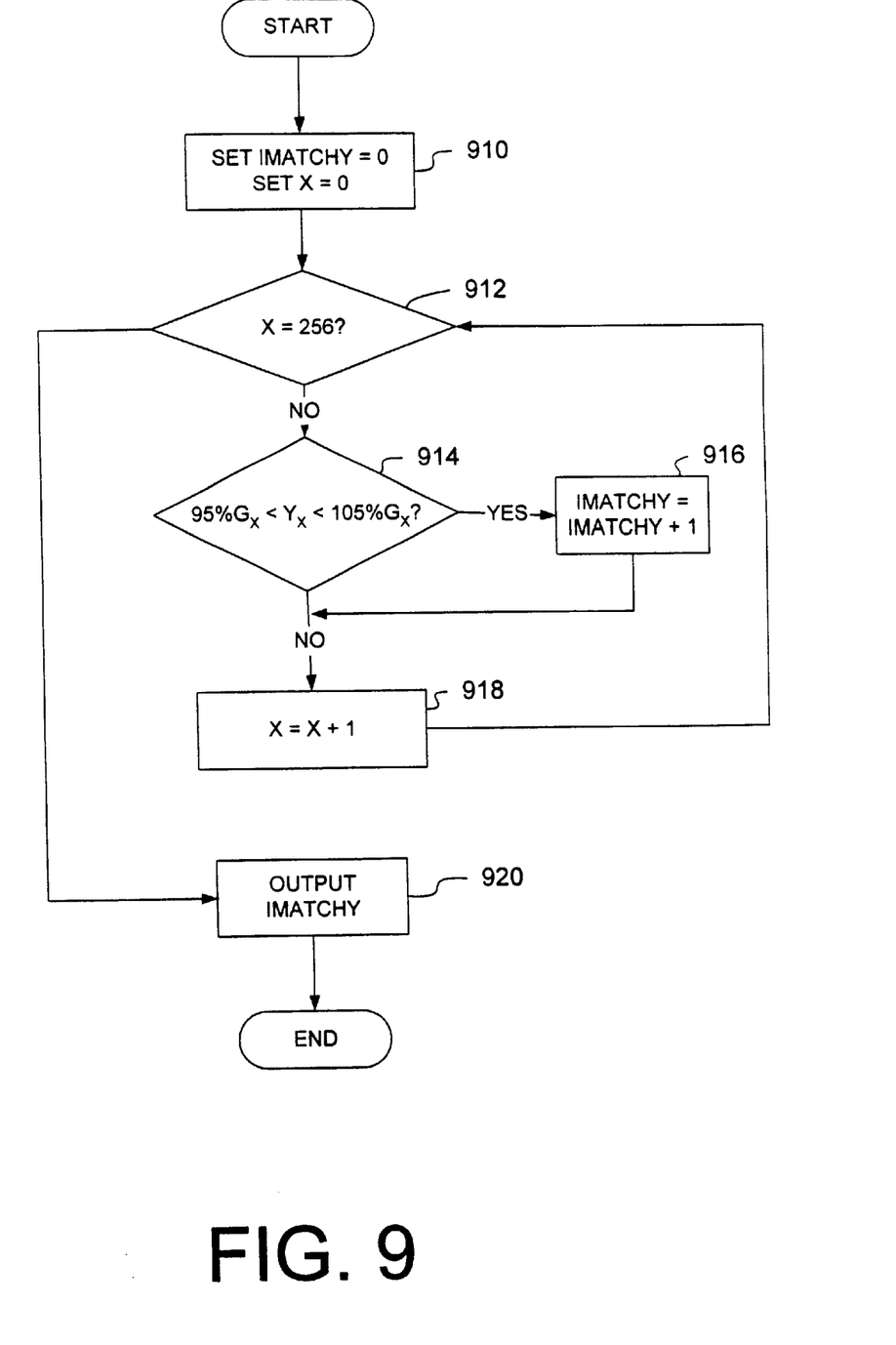
FIGS. 9 and 10 are flow charts showing the processing for performing the black and white or color determination (step 316) of FIG. 3.
Figure 10:
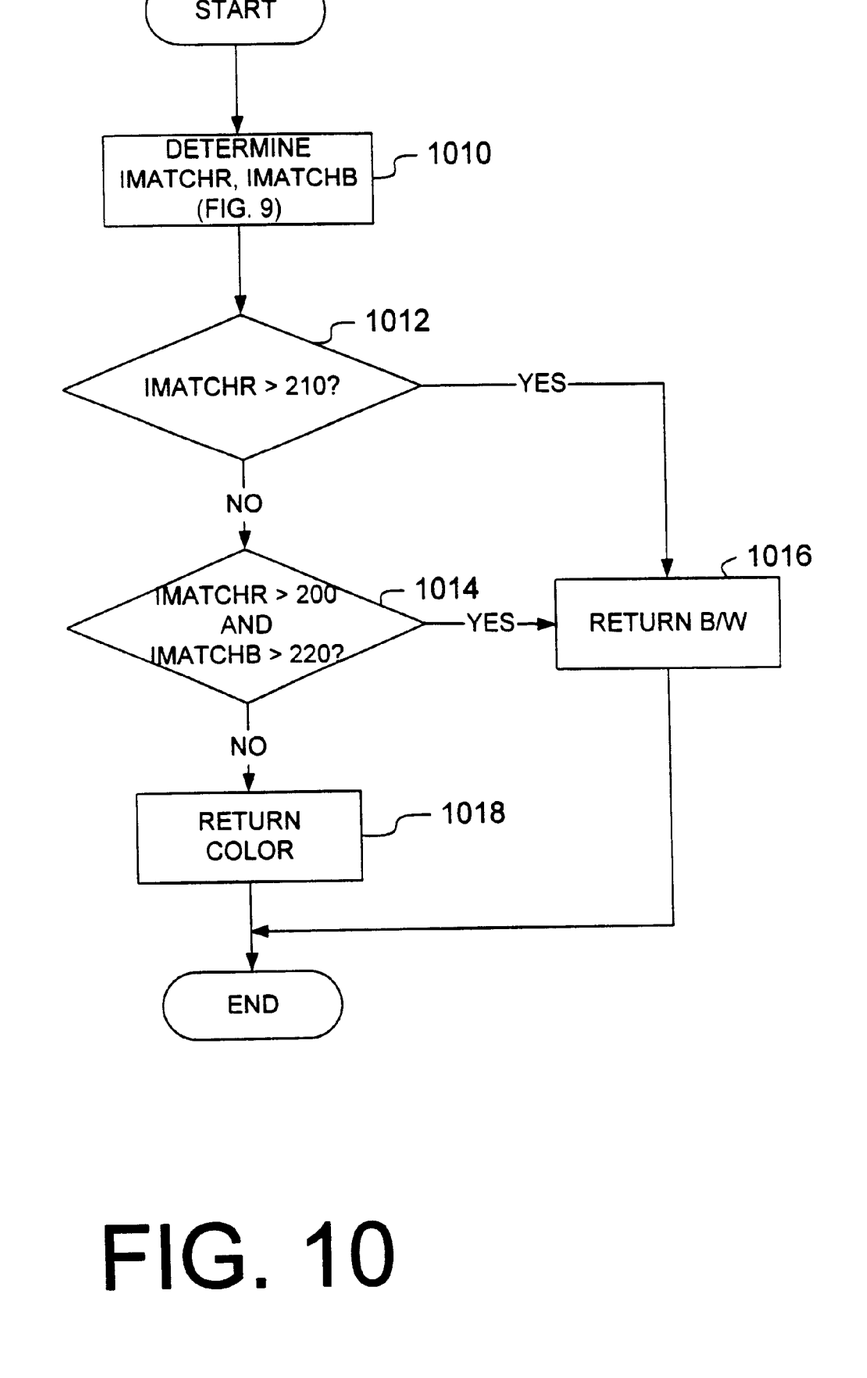

FIGS. 9 and 10 are flow charts showing the processing performed by computer 112 in determining whether the image is black and white or color (FIG. 3, step 316). Computer 112 first develops a correlation value defining how strongly the red histogram and the gray histogram are correlated, and a correlation value defining how strongly the blue histogram and the gray histogram are correlated.

FIG. 9 is a flow chart illustrating the processing performed by computer 112 in developing a correlation value between the gray histogram and a color histogram. More particularly, the processing shown in FIG. 9 by computer 112 calculates a value IMATCHY, where the Y in IMATCHY is R, G or B, depending on whether the red, green or blue correlation is being determined.

Computer 112 first sets variable IMATCHY to zero, and variable X to zero (step 910). Variable X represents the color value, which starts at 0 and continues through 255. X is then checked to see if it has reached 256 (step 912). $G_x$ represents the gray frequency corresponding the particular X value, and $Y_x$ represents the color frequency corresponding to the particular X value.

Computer 112 then determines whether $Y_x$ is greater than 95% of the corresponding gray value $G_x$ and less than 105% of $G_x$ (step 914). If $Y_x$ falls within this range, IMATCHY is incremented (step 916). X is then incremented by one (step 918), and processing continues at step 912. After computer 112 has stepped through each X value in the gray histogram and the color histogram, it outputs the value IMATCHY (step 920), which is a value indicating how strongly the gray histogram is correlated with the color histogram.

In one embodiment, the correlation of FIG. 9 is performed for the red histogram to develop IMATCHR, indicating how strongly the red histogram correlates with the gray histogram, and for the blue histogram to develop IMATCHB, which indicates how strongly the blue histogram correlates with the gray histogram. The strength of the correlations between the color histograms and the gray histogram can be used to determine whether the image is black and white or color.

FIG. 10 is a flow chart showing the processing performed by computer 112 in determining whether the image is a color image or a black and white image. Computer 112 first determines IMATCHR and IMATCHB using the processing shown in the flow chart of FIG. 9 (step 1010). If correlation value IMATCHR>210 (step 1012), an indication that the image is black and white is returned (step 1016). If IMATCHR is less than or equal to 210, computer 112 then determines whether IMATCHR is greater than 200 and IMATCHB is greater than 220 (steps 1012, 1014). If IMATCHR is greater than 200 and IMATCHB is greater than 220, then an indication that the image is black and white is returned (step 1016). If IMATCHR is greater than 200 and IMATCHB is greater than 220 is not met, an indication that the image is color is returned (step 1018).

Computer 112 has now analyzed the initial low resolution scan data to determine the rectangular area encompassing the image, whether the image is a photo, text or mixed photo and text, and whether the image is black and white or color. Based on this information, computer 112 develops commands which are sent to scanner 110 instructing scanner how to scan the image. For example, computer 112 may send a command to scanner 110 which directs scanner to perform a one color or three color scan, and a 1-bit or 8-bit pixel depth. A one color scan may use one bit (black and white) or eight bits (gray scale), whereas a three color scan (R, G, B) usually uses eight bits per color.

Computer 112 also uses rectangle $C_1C_2C_3C_4$ to direct scanner 110 to perform a scan over a particular area of the scanner bed. For example, computer 112 may send a command to scanner 110 defining the upper left corner of the image area to be scanned, and the dimensions of the scan area. Computer 112 may alter the area of the scan defined in a command based on the type of image. For example, computer 112 may enlarge the scan area of the image is a text image to ensure that underscores are captured by the scan.

V. CONCLUSION

It will be apparent to those skilled in the art that various modifications and variations can be made in the improved autolocate and black and white or color techniques without departing from the scope or spirit of the invention. The apparatus and method may be embodied entirely in hardware, entirely in software, or in a combination of hardware and software. If the apparatus or method consistent with the improved black and white or color determination technique is embodied in whole or in part in software, then the software can be embodied on any computer-readable or useable medium, such as a memory, a disk, or a signal on a line.

The autolocate and black and white or color determination techniques disclosed herein may be used together, as described herein, or separately. The autolocate technique has certain advantages that may be used independently of the black and white or color determination. Similarly, the black and white or color determination has certain unique advantages, and thus may be used independently of the autolocate technique.

Although the autolocate and black and white and color determination techniques disclosed herein are performed by a computer external to the scanner, the techniques could also be performed by the scanner. The techniques could also be carried out by a computer remote from the scanner, such as a computer connected to the scanner via one or more networks.

Moreover, although certain aspects of the invention have been described in terms of particular thresholds and values, one of ordinary skill will recognize that other thresholds and values may be used without departing from the spirit and scope of the invention.

Other embodiments of the invention will be apparent to those skilled in the art from consideration of the specification and practice of the disclosed embodiments. The specification and examples are exemplary only, and the true scope and spirit of the invention is defined by the following claims and their equivalents.

What is claimed is:

1. A method for scanning based on image type comprising:
   pre-scanning a first area in low density resolution to obtain low density initial scan data;
   automatically determining without human intervention a second area representing a subset of the first area based on the low density initial scan data, the second area containing a target image;
   determining the target image type based on the second area, the target image type chosen from a set of image types; and
   scanning the first area based on the target image type to obtain higher density target image data.

2. The method of claim 1, wherein the low density initial scan data comprises a set of values, each value representing a pixel in the first area, and the step of automatically determining without human intervention the second area comprises:
   converting the low density initial scan data to black and white data; and
   determining the second area based on the black and white data.

3. The method of claim 2, wherein the step of converting the low density initial scan data to black and white data comprises:
   converting a value to a black indicator if the value exceeds a threshold; and
   converting a value to a white indicator if the value is less than the threshold.

4. The method of claim 3, wherein the step of determining the second area comprises:
   determining coordinates of a first black indicator following a white indicator; and
   determining sides of the second area based on the coordinates.

5. The method of claim 1, wherein the step of scanning the first area comprises:
   scanning the first area using a lowest effective resolution area for the type of target image.

6. The method of claim 1, wherein the step of determining the target image type based on the low density initial scan data comprises:
   generating red, green, and blue histograms of the first area based on the low density initial scan data;
   determining a gray value histogram based on the red, green, and blue histograms;
   comparing the gray value histogram to each of a set of characteristic gray histograms, each characteristic gray histogram representative of text, photo, or a mixture of text and photo; and
   returning an indication that the target image type is photo, text, or a mixture of photo and text based on the comparisons.

7. The method of claim 6, wherein the step of comparing comprises:
   determining a minimum and maximum for the gray value histogram; and
   comparing the minimum and maximum to predetermined ranges for photo, text, and mixture of photo and text.

8. A system for optimizing a scan based on image type comprising:
   means for pre-scanning a first area in low density resolution to obtain low density initial scan data;
   means for determining automatically without human intervention a second area representing a subset of the first area based on the low density initial scan data, the second area containing a target image;
   means for determining the target image type based on the second area, the target image type chosen from a set of image types; and
   means for scanning the first area based on the target image type to obtain higher density target image data.

9. The system of claim 8, wherein the low density initial scan data comprises a set of values, each value representing a pixel in the first area, and the means for determining automatically without human intervention the second area comprises:
   means for converting the low density initial scan data to black and white data; and
   means for determining the second area based on the black and white data.

10. The system of claim 9, wherein the means for converting the low density initial scan data to black and white data comprises:
    means for converting a value to a black indicator if the value exceeds a threshold; and
    means for converting a value to a white indicator if the value is less than the threshold.

11. The system of claim 10, wherein the means for determining the second area comprises:
    means for determining coordinates of a first black indicator following a white indicator; and
    means for determining sides of the second area based on the coordinates.

12. The system of claim 8, wherein the means for scanning the first area comprises:
    means for scanning the first area using a lowest effective resolution area for the type of target image.

13. The system of claim 8, wherein the means for determining the target image type based on the low density initial scan data comprises:
    means for generating red, green, and blue histograms of the first area based on the low density initial scan data;
    means for determining a gray value histogram based on the red, green, and blue histograms;
    means for comparing the gray value histogram to each of a set of characteristic gray histograms, each characteristic gray histogram representative of text, photo, or a mixture of text and photo; and
    means for returning an indication that the target image type is photo, text, or a mixture of photo and text based on the comparisons.

14. The system of claim 13, wherein the means for comparing comprises:
    means for determining a minimum and maximum for the gray value histogram; and
    means for comparing the minimum and maximum to predetermined ranges for photo, text, and mixture of photo and text.

15. An apparatus for optimizing a scan based on image type comprising:
    a scanner for:
       pre-scanning a first area in low density resolution to obtain low density initial scan data;
    a processor configured to:
       determine automatically a second area without human intervention representing a subset of the first area based on the low density initial scan data, the second area containing a target image, determine the target image type based on the second area, the target image type chosen from a set of image types, and return to the scanner an indicator representing the target image type; and wherein the scanner further scans the first area based on the target image type to obtain higher density target image data.

16. The apparatus of claim 15, wherein the processor configured to determine the second area is further configured to:

convert the low density initial scan data to black and white data; and determine the second area based on the black and white data.

17. The apparatus of claim 16, wherein the low density initial scan data comprises a set of values, each value representing a pixel in the first area, and the processor configured to convert the low density initial scan data is further configured to:

convert a value to a black indicator if the value exceeds a threshold; and convert a value to a white indicator if the value is less than the threshold.

18. The apparatus of claim 17, wherein the processor configured to determine a second area is further configured to:

determine coordinates of a first black indicator following a white indicator; and determine sides of the second area based on the coordinates.

19. The apparatus of claims 15, wherein the scanner further scans the first area using a lowest effective resolution area for the type of target image.

20. The apparatus of claim 15, wherein the processor configured to determine the target image type based on the low density initial scan data is further configured to:

generate red, green, and blue histograms of the first area based on the low density initial scan data;

determine a gray value histogram based on the red, green, and blue histograms;

compare the gray value histogram to each of a set of characteristic gray histograms, each characteristic gray histogram representative of text, photo, or a mixture of text and photo; and return an indication that the target image type is photo, text, or a mixture of photo and text based on the comparisons.

21. The apparatus of claim 20, wherein the processor configured to compare is further configured to:

determine a minimum and maximum for the gray value histogram; and compare the minimum and maximum to predetermined ranges for photo, text, and mixture of photo and text.

22. A computer-readable medium containing instructions for performing a method for optimizing a scan based on image type, the method comprising:

pre-scanning a first area in low density resolution to obtain low density initial scan data;

determining automatically without human intervention a second area representing a subset of the first area based on the low density scan data, the second area containing a target image;

determining the target image type based on the second area, the target image type chosen from a set of image types; and scanning the first area based on the target image type to obtain higher density target image data.

23. The medium of claim 22, wherein the low density initial scan data comprises a set of values, each value representing a pixel in the first area, and the step of determining automatically without human intervention the second area comprises:

converting the low density initial scan data to black and white data; and determining the second area based on the black and white data.

24. The medium of claim 23, wherein the low density initial scan data comprises a set of values, each value representing a pixel in the first area, and the step of converting the low density initial scan data comprises:

converting a value to a black indicator if the value exceeds a threshold; and converting a value to a white indicator if the value is less than the threshold.

25. The medium of claim 24, wherein the step of determining the second area comprises:

determining coordinates of a first black indicator following a white indicator; and determining sides of the second area based on the coordinates.

26. The medium of claim 22, wherein the step of scanning the first area comprises:

scanning the first area using a lowest effective resolution area for the type of target image.

27. The medium of claim 22, wherein the step of determining the target image type based on the low density initial scan data comprises:

generating red, green, and blue histograms of the first area based on the low density initial scan data;

determining a gray value histogram based on the red, green, and blue histograms;

comparing the gray value histogram to each of a set of characteristic gray histograms, each characteristic gray histogram representative of text, photo, or a mixture of text and photo; and returning an indication that the target image type is photo, text, or a mixture of photo and text based on the comparisons.

28. The medium of claim 27, wherein the step of comparing comprises:

determining a minimum and maximum for the gray value histogram; and comparing the minimum and maximum to predetermined ranges for photo, text, and mixture of photo and text.

* * * * *